(No Model.)
V. E. DOREMUS.
LOCK NUT.
No. 478,742. Patented July 12, 1892.
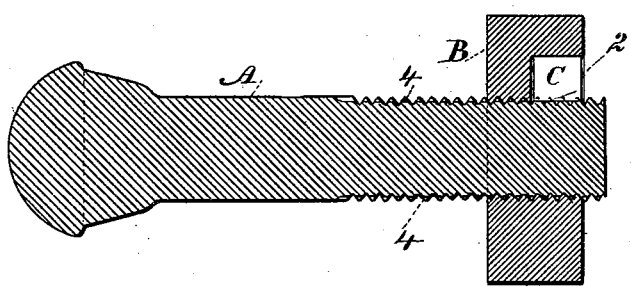
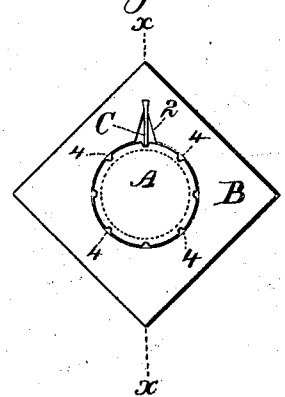
Witnesses
Chas H. Smith
J. Staib
Inventor
Victor E. Doremus
per
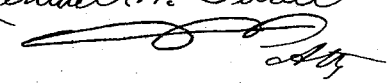
Atty

UNITED STATES PATENT OFFICE.

VICTOR E. DOREMUS, OF NEW YORK, N. Y., ASSIGNOR OF ONE-HALF TO PAUL P. TODD, OF SAME PLACE.

LOCK-NUT.

SPECIFICATION forming part of Letters Patent No. 478,742, dated July 12, 1892.

Application filed April 18, 1892. Serial No. 429,521. (No model.)

*To all whom it may concern:*

Be it known that I, VICTOR E. DOREMUS, a citizen of the United States, residing in the city and State of New York, have invented an Improvement in Lock-Nuts, of which the following is a specification.

Spring-pawls in various forms have been made use of for holding the nut and preventing the same turning backwardly and becoming loose.

My present invention is made for protecting the spring-pawl from injury and for allowing such pawl to work in either direction, so that the nut can be unscrewed when the pawl occupies a radial position to the bolt; but such pawl exerts the force necessary to prevent the nut turning backwardly under the ordinary circumstances of use.

In the drawings, Figure 1 is an elevation endwise of the bolt, and Fig. 2 is a section at the line $x$ $x$.

The bolt A is of any desired character, and it is made with either a square or elongated head or shank, so that the bolt itself, when introduced through the joint-rails and track-rails upon the railway or when applied in any other position, will not rotate, and the nut B is polygonal, as usual, and fitted to screw upon the bolt. The screw-threaded portion of the bolt is grooved longitudinally at suitable distances apart. Preferably there are six or eight of these longitudinal grooves or channels, as shown at 4 in Fig. 1, and such longitudinal grooves or channels may be in the form of saw-cuts or they may be V-shaped. A recess is forged or otherwise made in the nut, preferably extending toward one angle of such nut, and this recess is V-shaped, as shown at 2, and there is a slot or mortise at the bottom of the recess for the reception of the spring C, and this spring C is preferably made with a base that is wider than the point of the spring, so that the base may be driven into the mortise or slot at the base of the recess and secured firmly therein by the act of driving, or the metal of the nut may be slightly upset or compressed to hold the spring in its place. The length of the spring is such that when it occupies a radial or nearly radial position to the bolt the point of the spring is at or near the bottom of one of the recesses. Hence as the nut is rotated in setting up or tightening the nut the spring bends in one direction within the recess 2 and acts in the capacity of a pawl to prevent the nut being turned backwardly, and this operation can be continued to any desired extent as the nut is screwed up to place, and the spring occupies the position of an inclined pawl; but when it is desired to unscrew the nut the end of the spring is brought to one of the longitudinal grooves in the bolt, and in turning the nut backwardly the point of the spring enters the longitudinal groove, and as the nut is turned the spring assumes a radial position and then passes to an inclination in the opposite direction, so that the point of the spring runs over the convolutions of the thread and passes the longitudinal grooves in succession until the nut becomes separated from the bolt, and the nut can be screwed on again when desired.

By this improvement the spring is shielded from injury and the nut can be rotated in either direction; but the spring assumes the position of a pawl to prevent the nut unscrewing after it has been screwed up to the desired point.

It is immaterial at what point the rotation of the nut in screwing the same up may be stopped, and the end of the spring might be on the screw-threaded portion; but usually the spring will pass into one of the slots and remain in a radial position, or nearly so. Hence the nut cannot be turned in either direction until sufficient force has been exerted to bend the spring as the threads pass under the ends of such spring.

I claim as my invention—

The combination, with a screw-bolt having longitudinal channels across the screw-threads, of a nut having a recess and a spring secured within the recess, the spring standing nearly radially when the point is within either of the channels and the point of the spring can ride over the screw-threads as the nut is rotated in either direction, substantially as set forth.

Signed by me this 15th day of April, 1892.

VICTOR E. DOREMUS.

Witnesses:
GEO. T. PINCKNEY,
WILLIAM G. MOTT.